United States Patent [19]

Nusbaum

[11] Patent Number: 4,580,379
[45] Date of Patent: Apr. 8, 1986

[54] UNDERFLOOR ASSEMBLY SYSTEM HAVING SUB-FLOOR ACCESSORY PANELS

[75] Inventor: Arthur Nusbaum, Fort Lee, N.J.

[73] Assignees: Robert Nusbaum; Howard Nusbaum, both of New York, N.Y.; Barbara Selick, Teaneck, N.J.

[21] Appl. No.: 723,356

[22] Filed: Apr. 15, 1985

Related U.S. Application Data

[63] Continuation-in-part of Ser. No. 459,599, Jan. 20, 1983, Pat. No. 4,558,546, and a continuation-in-part of Ser. No. 516,849, Jul. 25, 1983.

[51] Int. Cl.$^4$ ............................................. E04B 5/48
[52] U.S. Cl. ..................................... 52/221; 52/577; 52/671; 52/674
[58] Field of Search ................ 52/221, 220, 630, 671, 52/674, 577

[56] References Cited

U.S. PATENT DOCUMENTS

| | | | |
|---|---|---|---|
| 2,877,990 | 3/1959 | Goemann | 52/221 |
| 2,912,848 | 11/1959 | Lee et al. | 52/221 |
| 2,946,413 | 7/1960 | Wiesmann | 52/221 |
| 3,061,663 | 10/1962 | Reiland | 52/221 |
| 3,074,208 | 1/1963 | Seidel | 52/221 |
| 3,282,298 | 11/1966 | Hudson | 52/221 |
| 3,676,568 | 7/1972 | Fork | 52/221 |
| 3,715,844 | 2/1973 | Breading | 52/221 |
| 3,721,051 | 3/1973 | Fork | 52/221 |
| 3,793,793 | 2/1974 | Dobbins | 52/221 |
| 3,851,674 | 12/1974 | Fork | 52/221 |
| 3,886,702 | 6/1975 | Fork | 52/221 |
| 3,903,666 | 9/1975 | Fork | 52/221 |
| 3,932,696 | 1/1976 | Fork et al. | 52/221 X |
| 4,030,259 | 6/1977 | Meckler | 52/221 |
| 4,096,347 | 6/1978 | Penczak et al. | 52/221 X |
| 4,178,469 | 12/1979 | Fork | 52/221 X |
| 4,250,675 | 2/1981 | Meckler | 52/221 |

FOREIGN PATENT DOCUMENTS 7810412  4/1980  Netherlands .......................... 52/221

Primary Examiner—Carl D. Friedman
Assistant Examiner—Naoko N. Slack
Attorney, Agent, or Firm—Jacobs & Jacobs

[57] ABSTRACT

The underfloor assembly for a building comprises corrugated metal flooring units preferably side-by-side with cable distribution ducts, over which is mounted cable trenches. Each distribution duct has a bottom plate and a plurality of closed cells with less than all of the cells having portions cut away to thus leave free areas under the trenches. An opening is provided in the bottom plate at a desired free area, and an open pan extends through the opening and below the bottom plate. The bottoms of the trenches are open where they intersect the ducts to provide access to the pans as well as to provide access between the trenches and the ducts and additional space below the trench to accommodate splices and bends in the cables. The pans can also be accessed from the floor below via the ceiling suspended below the pans.

10 Claims, 12 Drawing Figures

UNDERFLOOR ASSEMBLY SYSTEM HAVING SUB-FLOOR ACCESSORY PANELS

This is a continuation-in-part of my applications Ser. No. 459,599 filed Jan. 20, 1983 now U.S. Pat. No. 4,558,546 and Ser. No. 516,849 filed July 25, 1983, both of which are incorporated herein by reference thereto.

The present invention relates to an underfloor assembly for a metal deck and concrete floor. In particular, the present invention provides an underfloor assembly for a building, comprising a plurality of elongated, corrugated, metal flooring units and a plurality of elongated, metal cable distribution ducts, preferably arranged side-by-side with said flooring units, said flooring units and said cable distribution ducts being adapted to be supported by the structural beams of the building; and a plurality of spaced-apart elongated cable trenches adapted to carry cables of different types therein and extending over and transversely across said flooring units and said cable distribution ducts; and open pan means suspended from said cable distribution ducts for storing electrical or electronic accessory panels below the cable distribution duct at desired intersections of the cable distribution ducts and cable trenches; said trenches comprising a longitudinally extending U-shaped base pan means having a bottom portion with apertures therein at said intersections of said trenches and said distribution ducts for permitting direct access from said trench to the distribution duct and the electronic or electrical accessory panel below. As will be described in detail hereinafter, the housing means also permits access to the trench and distribution duct from the ceiling below.

The present invention is illustrated in terms of its preferred embodiments in the accompanying drawings, in which.

Figure 1:
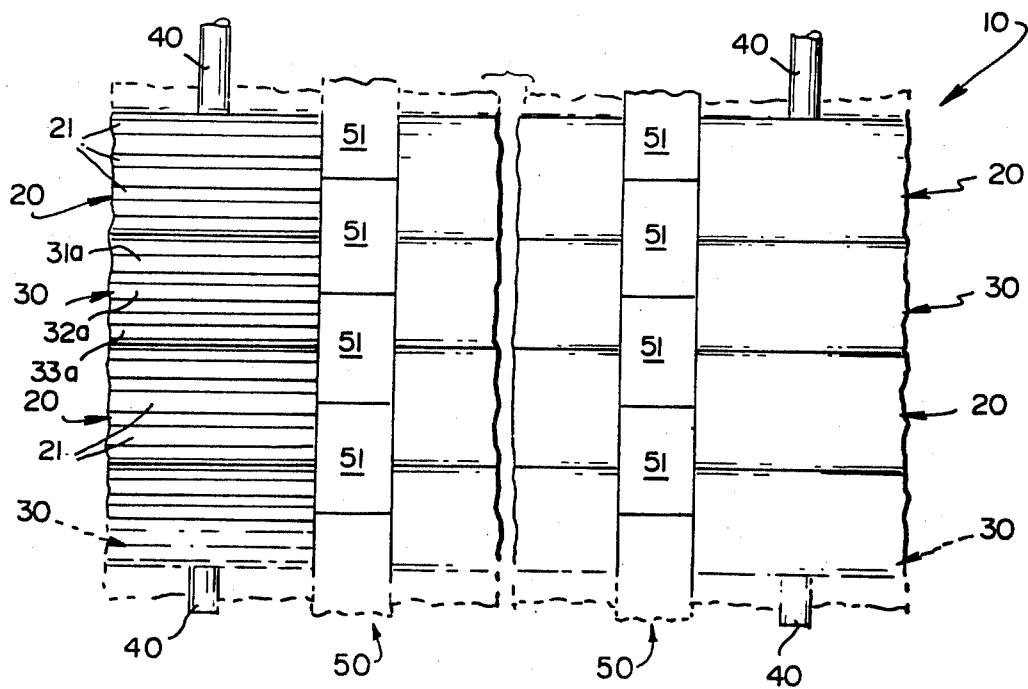
FIG. 1 is a diagrammatic top plan view of an underfloor assembly according to the invention.

Referring to the drawings, FIG. 1 shows an underfloor assembly 10 comprising conventional corrugated metal flooring units 20 having alternating crests 21 and troughs 22, joined edge-to-edge in a conventional manner to distribution ducts 30 which are also made of metal. The metal flooring 20 and the cable distribution ducts 30 are supported by structural beams 40, in a conventional manner.

A plurality of cable trenches 50 made of metal rest on the metal flooring 20 and the distribution ducts 30. Trenches 50 are tack-welded or bolted to the metal flooring 20 and ducts 30 as is conventional. Trenches 50 have removable covers 51 to permit access to the distribution ducts 30 as will be described in detail hereinafter. After the assembly 10 has been completed, concrete is poured over the metal flooring 20 and cable distribution ducts 30 so as to be level with the top of the trenches 50, as is conventional. Covers 51 are kept on the trenches 50 during the pouring of the concrete so as to keep concrete from entering the trenches 50.

Figure 2A:
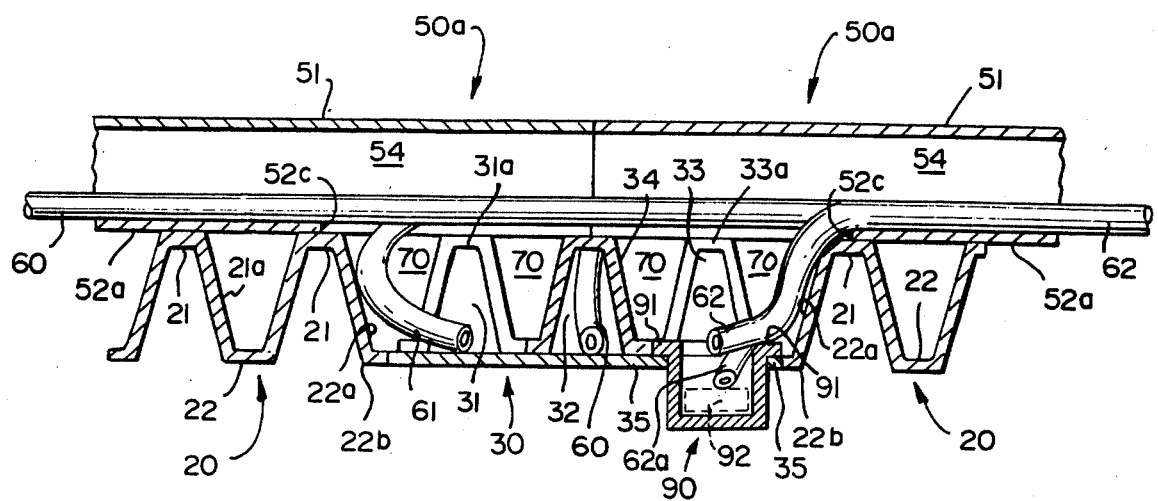
FIG. 2A is an elevational view, in section, taken along lines 2A—2A in FIG. 2.
Figure 2:
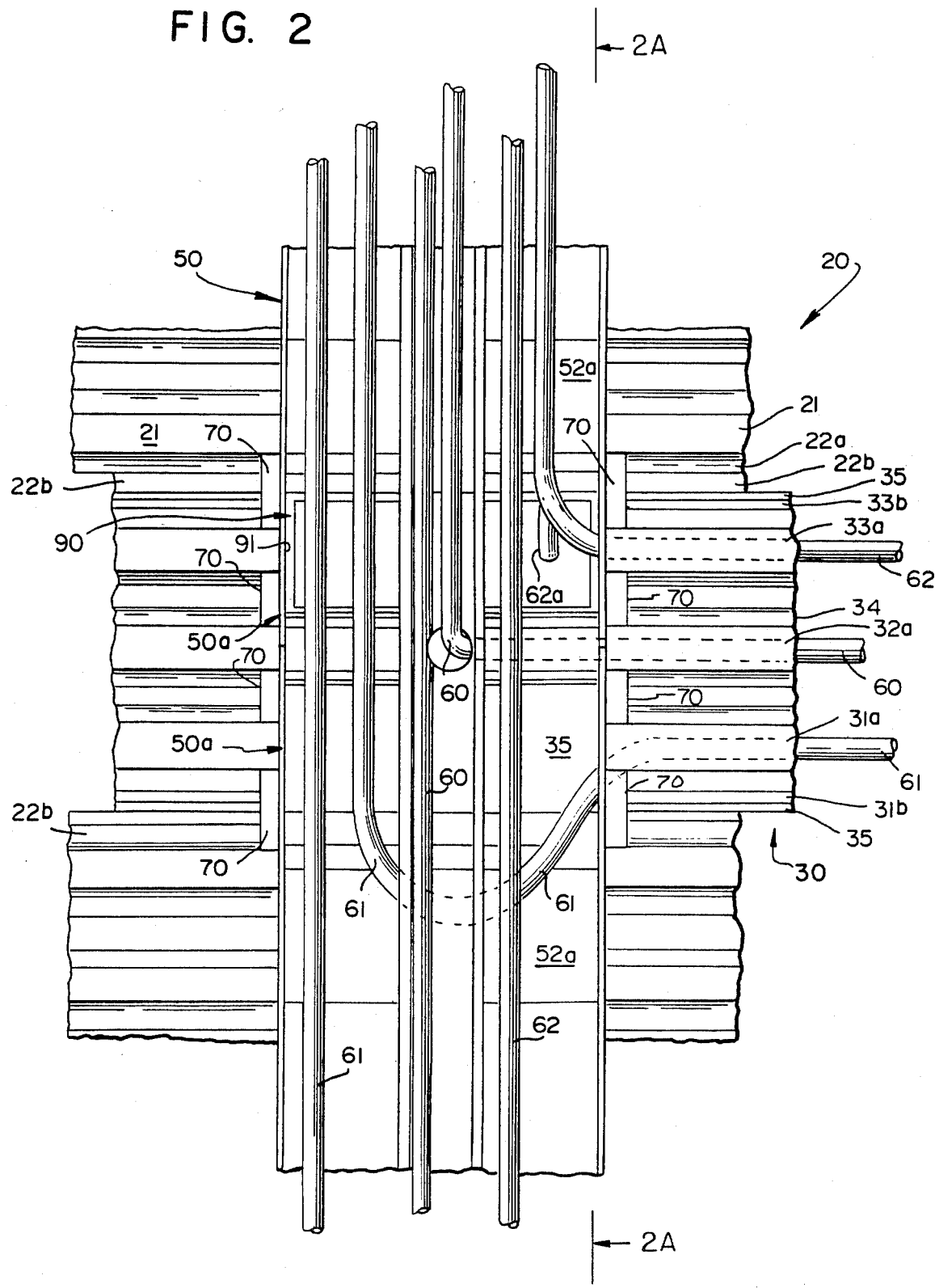
FIG. 2 is an enlarged top plan view of the intersection of a cable trench and a cable distribution duct having an accessory pan according to the invention, with the trench covers removed.

Referring to FIG. 2, it can be seen that the metal flooring 20 and the distribution ducts 30 are in side-by-side relationship. It is presently preferred that ducts 30 be 12 to about 16 inches wide and be spaced apart four feet center-to-center. However, it is within the spirit of this invention to space them more or less than four feet apart. Any conventional corrugated metal flooring may be used as the metal flooring 20. FIG. 2 shows trenches 50 with the removable covers 51 removed for clarity in revealing the intersection of trench 50 and distribution duct 30. As will be discussed in detail hereinafter, an accessory pan 90 is provided at desired intersections of ducts 30 and trenches 50.

Figure 3:
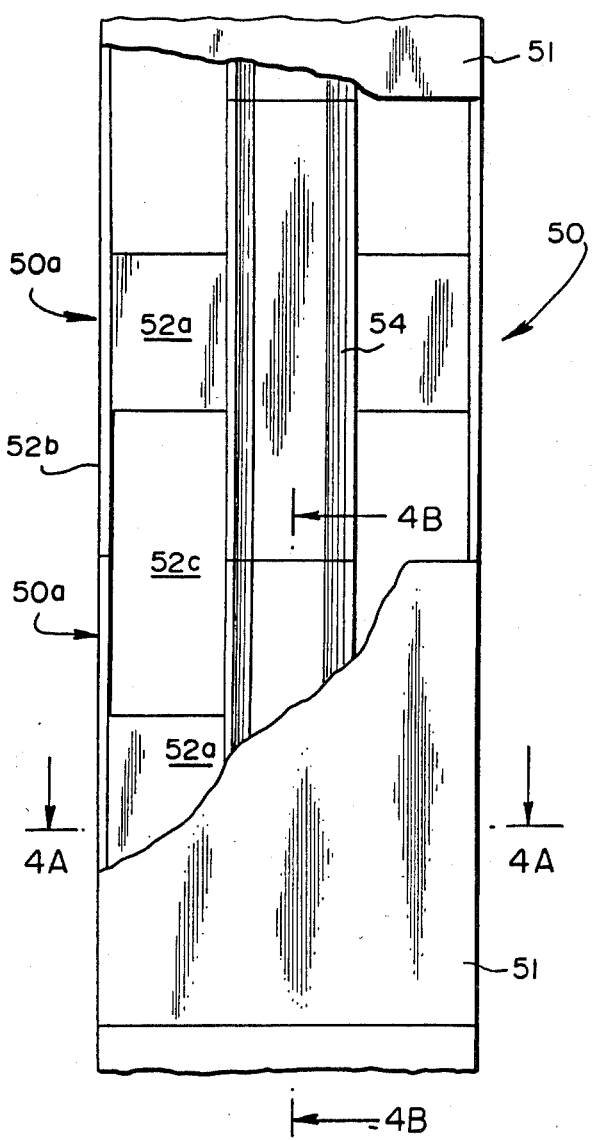
FIG. 3 is a top plan view of the cable trench according to the present invention.
Figure 4A:
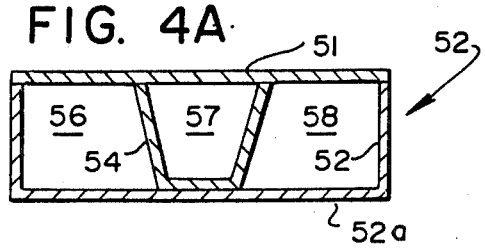
FIG. 4A is an elevational view, in section, taken along lines 4A—4A in FIG. 3.
Figure 4B:
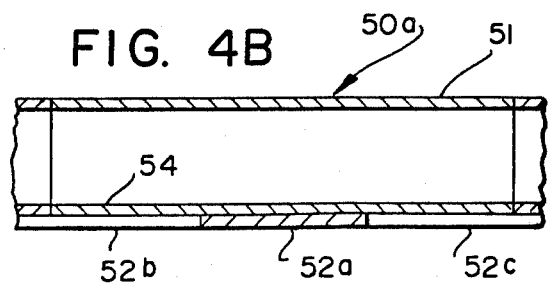
FIG. 4B is an elevational view, in section, taken along lines 4B—4B in FIG. 3.

As is most clearly seen in FIGS. 3, 4A and 4B, cable trench 50 is formed of a U-shaped base pan 52 having a horizontal bottom 52a and upright vertical sides 52b. Most desirably, the vertical sides 52b are integral with the bottom 52a of the base pan 52. Covers 51 are removably secured to the top of trench 50 by suitable fastening means (not shown), such as bolts, that are used in cable trenches. Trenches 50 may be of any suitable width, such as from about 24 to about 60 inches wide, and can be spaced apart at any suitable distance, such as from about one to about 100 feet apart, but usually from about 50 to 80 feet apart.

While the vertical walls 52b of base pan 52 are continuous along the extent of trench 50, the bottom 52a of the base pan 52 has several access windows or apertures 52c (FIG. 3) so that when cover 51 is removed, access to the distribution duct 30 (FIG. 2) is permitted through the aperture 52c. Aperture 52c extends longitudinally along trench 50 for a sufficient distance such that the edges of the base pan bottom 52a will lie approximately at the mid-point of a crest 21 of the metal cellular flooring 20 (FIG. 2A). In this way, there is some tolerance in the placement of trench 50 over the metal flooring units 20. Apertures 52c may be from about 16 to about 20 inches long and from about 20 to about 50 inches wide.

Preferably centrally located within trench 50 is a U-shaped trough 54 which is welded or otherwise secured to the base pan bottom 52a. Trough 54 will usually carry electrical power cables 60 (FIG. 2), but in a given system, any of the cells 56, 57, 58 (FIG. 4A) may be the power cable cell.

As is seen most clearly in FIGS. 3, 4A and 4B, trench 50 is composed of sub-units 50a, which comprise a pair of opposed side walls 52b, a centrally located base pan bottom 52a, and a section of trough 54 coextensive with side walls 52b. Components 52a, 52b and 54 may be separately formed and then attached together or they may be all integrally formed, as by roll forming. Sub-units 50a are preferably shipped with covers 51 attached and they are field assembled to form trench 50 by bolting adjacent ends of sub-units 50a together. In this way, each sub-unit 50a has sufficient structural integrity for transport and field assembly.

Each sub-unit 50a has part of an aperture 52c at each end, the full extent of each aperture 52c being formed when adjacent sub-units 50a are connected. Alternatively, trenches 50 may be formed of sub-units (not shown) having one or more apertures 52c shop-cut therein.

Figure 5:
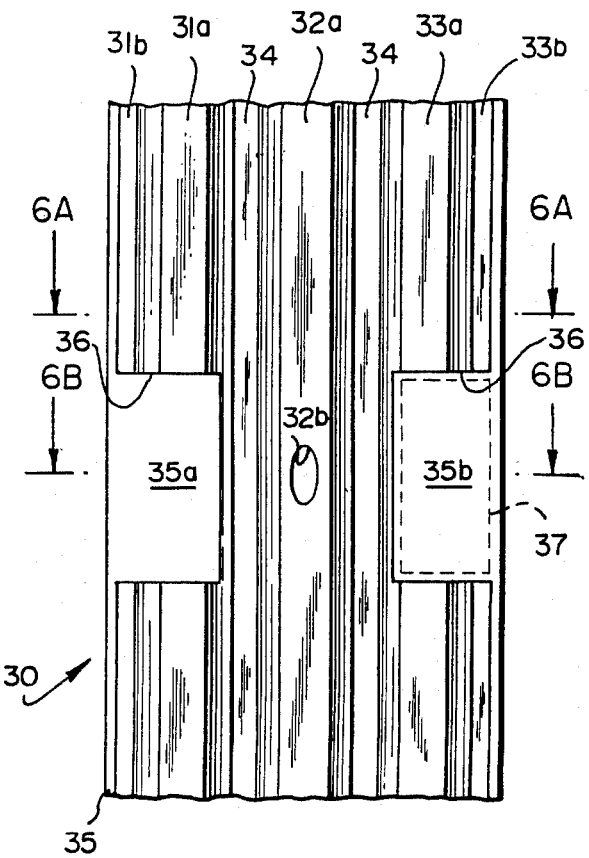
FIG. 5 is a view similar to FIG. 3 showing the cable distribution duct according to the present invention.
Figure 6A:
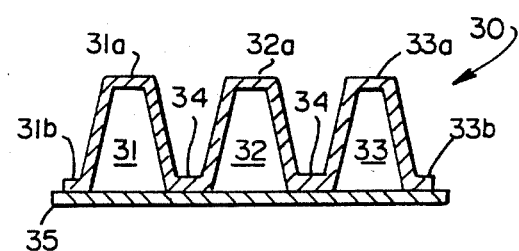
FIG. 6A is an elevational view, in section, taken along lines 6A—6A in FIG. 5.
Figure 6B:
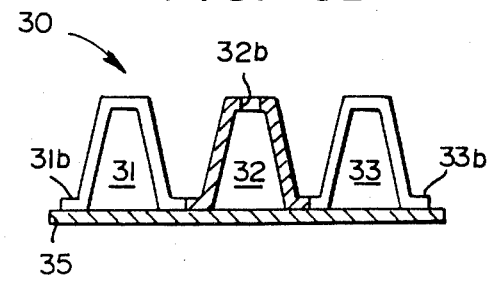
FIG. 6B is an elevational view, in section, taken along lines 6B—6B in FIG. 5.

As best seen in FIGS. 5, 6A and 6B, the distribution duct 30 comprises a corrugated unit providing elongated cells 31, 32 and 33 formed by alternating crests 31a, 32a and 33a and valleys 34. The corrugated unit is secured to an elongated continuous bottom plate 35 by any suitable means, such as welding. However, as in the case of trench 50, duct 30 may be roll-formed as an integral unit.

At suitable intervals along the length of duct 30, walls 31a and 33a are omitted (or cut away) to provide apertures 36, so that these apertures 36 will provide access to cells 31 and 33 at the areas of intersection between trench 50 and cable distribution duct 30 (FIG. 2A). Preferably, the apertures 36 will be preformed and not field cut. A preformed access port 32b may be provided in crest 32a to allow electrical cable 60 (FIG. 2) lying in member 54 of trench 50 to pass from the trench 50 through port 32b and thence into power cell 32. Most likely, port 32b will be field drilled.

Figure 7:
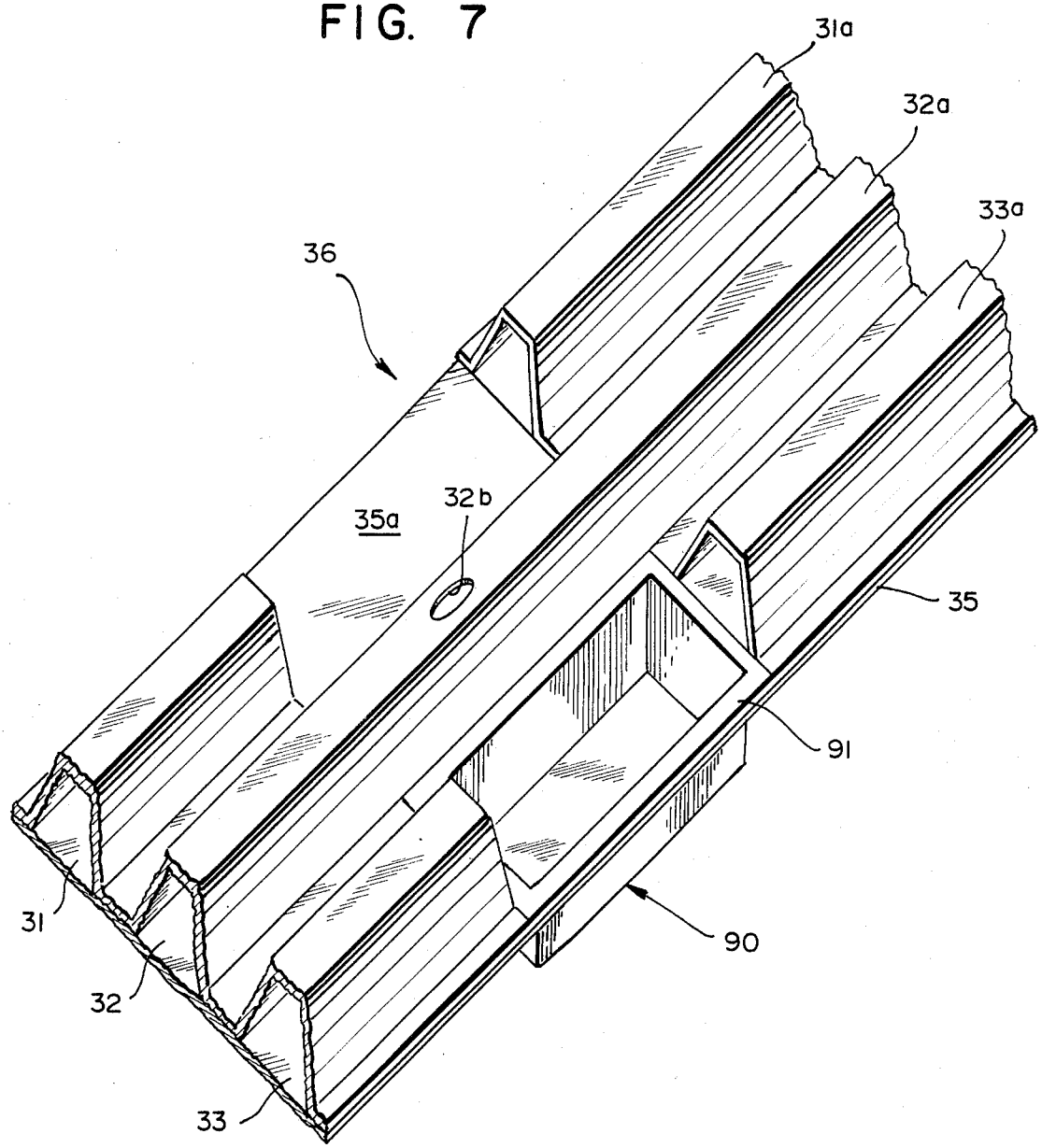
FIG. 7 is a schematic perspective view showing a distribution duct with an accessory pan in place.

FIGS. 2, 2A and 7 show a distribution duct 30 that was modified to include an accessory pan 90. In particular, the bottom plate 35 is shop-cut or field-cut in both, or preferably one, of the free areas 35a, 35b (FIG. 5) to provide aperture 37, shown in dotted line in FIG. 5, after which pan 90 is placed into the aperture and the flange or rim 91 is tack welded or otherwise secured to bottom plate 35. Accessory pan 90 will generally occupy the full space provided by the free area 35a or 35b. The large apertures 36 in duct 30 permit free and easy access of cables 61 and 62 into cells 31 and 33, respectively. In addition, the large aperture 36 enables free and easy access of cable 62 into the pan 90 and facilitates connecting cable 62 to an electrical or electronic accessory panel 92 (FIG. 2A) carried inside pan 90.

While the cross-section of cell 32 remains the same along duct 30, cells 31 and 33 have greatly enlarged cross-sectional areas where ducts 30 intersect trenches 50, because the walls 31a and 33a are removed at the intersections of ducts 30 with trenches 50. As seen most clearly in FIG. 2A, cells 31 and 33 each extend from the inclined side of cell 32 to the opposed inclined wall 22a of the adjacent flooring unit 20. The free areas 35a, 35b on bottom plate 35 enable the field assembly of a large open pan 90 to duct 30.

Figure 8:
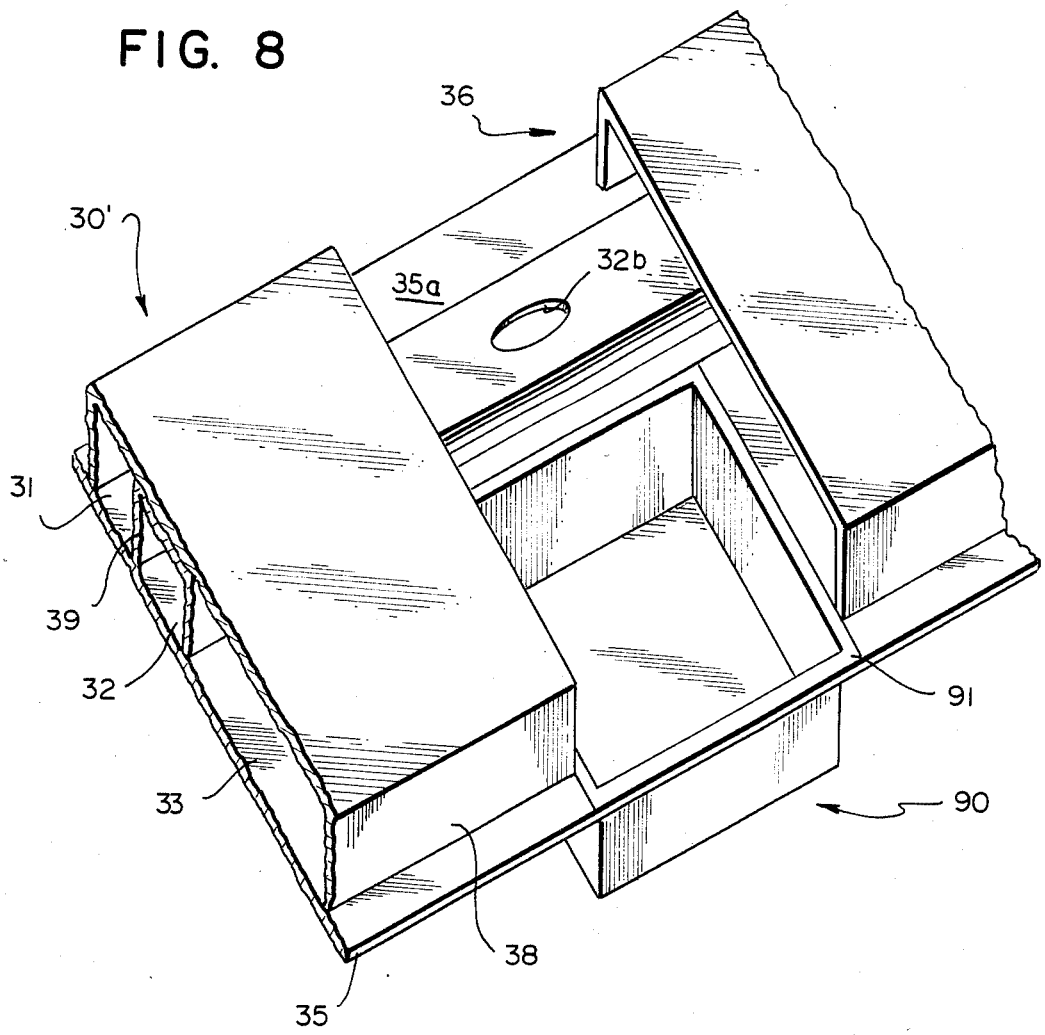
FIG. 8 is a schematic perspective view similar to FIG. 7 of another embodiment of the invention.
Figure 9:
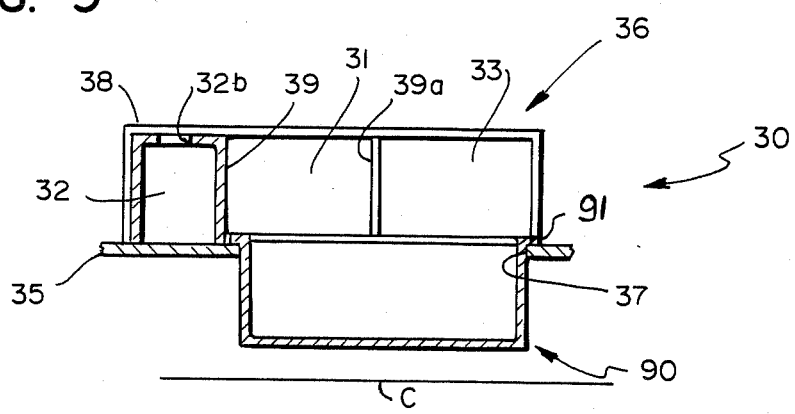
FIG. 9 is an elevational view, in section, similar to FIG. 6B, of another embodiment of the invention.

If cell 32 is centrally located in duct 30 as shown in FIGS. 1–7, either or both of the free areas 35a, 35b on the bottom plate 35 can be used to provide the aperture 37. If cell 32 is located off-center as shown in FIGS. 8 and 9, aperture 37 can have a larger width. Thus, FIG. 8 shows a cable distribution duct 30' having a bottom plate 35 to which is attached an inverted U-shaped housing or top 38. Inverted U-shaped divider 39 within housing 38 provides cells 31, 32 and 33. Housing 38 is interrupted or omitted to provide the apertures 36 at the intersections of ducts 30' and trenches 50. Duct 30' thus provides the large area of access between duct 30' and trench 50 at their intersection. Bottom plate 35 will have free areas of different sizes on either side of the off center power cell 32. Pan 90 is field assembled to duct 30' in the same way as it is assembled to duct 30, preferably by providing the aperture 37 in the larger free area 35b as shown.

FIG. 9 shows duct 30" with the off center power cell 32 being located at the edge of bottom plate 35 so that it is an outer cell. Divider 39a extends throughout housing 38 to provide cells 31 and 33. Housing 38 and divider 39a are omitted at the intersections of duct 30" and trenches 50 to provide an aperture 36 on one side of power cell 32, and to provide a free area on plate 35. Pan 90 extends through the aperture 37 cut in the free area on bottom plate 35 and is secured to plate 35.

If desired, divider 39a can be omitted entirely, in which case cells 31 and 33 are combined together to form one large closed cell.

At present, aperture 37 may suitably be from about 6 to about 15 inches wide and from about 12 to about 48 inches long. Pan 90 may suitably be from about 3 to about 9 inches deep, the maximum depth of the pan being a function of the location of the ceiling C (FIG. 9) below. It is presently preferred to locate power cell 32 off center as in duct 30' or 30" and to use a pan 90 of about 12 inches wide, 16 inches long and about 5 to 6 inches deep.

Completing the underfloor assembly 10 are plugs 70 (FIG. 2A), which are installed as by welding before the concrete is poured so as to prevent concrete from otherwise entering the open apertures 36 and 52a during the cement pour.

The underfloor assembly 10 according to the invention is assembled as follows. For simplicity, the distribution duct will be referred to as duct 30, but the following description applies with the same effect to ducts 30' and 30" as well. First the metal flooring 20 and the distribution ducts 30 are secured in place and joined together on beams 40 (FIG. 1) by securing the toes 22b of a unit 20 to plate 35 (FIGS. 2 and 2A) or to the toes 22b of an adjacent unit 30 or 20, respectively, by conventional means used in constructing corrugated metal flooring, such as by clinching together mating flanges (not shown) on the edges of plate 35 and toe 22b. Apertures 37 are field-cut or shop-cut in bottom plate 35 at the desired locations, and pans 90 are placed into the apertures and fastened to plate 35. Usually, pan 90 will not be required at each intersection of ducts 30 and trenches 50. Then the trench sub-units 50a, with covers 51 attached, are set down, connected together and secured to ducts 30 and to the crests 21 of the metal flooring 20. After the concrete is poured and set, covers 51 are removed and cables 60, 61 and 62 are then fed through the trenches 50 and the ducts 30. Electrical or electronic panels 92 (FIG. 2A) may be placed in pans 90 and spliced to the desired cable in trench 30. For example, cable 62 (FIGS. 2 and 2A) can be brought from trench 50 into cell 33 and can also be spliced to panel 92 via splice 62a. Interconnections between the cables in trenches 50 and ducts 30, are easily made at the desired point of interconnection, because the full extent of the cells 31, 32 and 33 is readily accessed. Bulky splices in the cables 61 and 62 in the trenches 50 and the ducts 30 are accommodated below trench 50 in the large cells 31 and 33. The large access space at the intersections of ducts 30 and trenches 50 also enables the desired cable, e.g. cable 62, to be spliced to a panel 92 (FIG. 2A) via splice 62a. The provision of the panels 92 greatly simplifies the connection of cables in the cable distribution duct 30 to electronic and/or electrical operating units above the floor. Thus, it is conventional to splice the large cable 62 in cell 33 to units above the floor. With panel 92, small cables run from panel 92 through cell 33 to the above-floor units. Connecting the above-floor units to cable 62 can thus be done at one location using easily handled small cables. Only one splice or connection to cable 62, e.g. via splice 62a, is needed. Also, as described hereinafter, pan 92 can be accessed through the ceiling C (FIG. 9) of the floor below.

After the concrete floor is poured, and usually after the cables 60, 61, 62 are run through the trenches 50 and ducts 30, 30′ or 30″, a conventional ceiling C is suspended from the floor as diagrammatically shown in FIG. 9. As is known, the space between ceiling C and the flooring 20 and ducts 30, 30′ or 30″ may be used for heating and airconditioning ducts, lighting fixtures and wires and the like. However, in the present invention, the ducts 30, 30′ and 30″ and trenches 50 may now be accessed from the floor below by opening ceiling C, as by removing a ceiling panel (not shown) to reveal the accessory pan 90 above the ceiling. The bottom of the pan 90 may then be cut to form an aperture through which cables or the like can be fed. As stated above, the depth of pan 90 can be such as to extend to ceiling C, but access to pan 90 can readily be obtained by removing one or more ceiling panels even if pan 90 is shallow.

In practice, the number and size of cables that provide electrical and other services per unit area of floor, is limited by the number and size of trenches 50. Thus, in the present invention, the larger storage area at the intersections of the trenches 50 and ducts 30, 30′ or 30″ enables the trenches 50 to carry larger size and/or a larger member of cables than heretofore possible, as well as to provide pans 90, while maintaining the trenches 50 at a given size and number. This is because the larger storage area is below the trench 50, which in turn enables the splices of cables in trench 50 to the cables in duct 30, 30′ or 30″ and the necessary bends in these cables, to be located below the trench 50 without using the limited space in the trench 50 for these purposes. In addition, useful storage space is created below ducts 30, 30′ or 30″ by the pans 90.

I claim:

1. An underfloor assembly for a building, comprising a plurality of elongated, corrugated, metal flooring units and a plurality of elongated, metal, cable distribution ducts arranged side-by-side with said flooring units, said flooring units and said cable distribution ducts being adapted to be supported by the structural beams of the building; a plurality of spaced-apart elongated cable trenches adapted to carry cables of different types therein and extending over and transversely across said flooring units and said cable distribution ducts; said cable distribution ducts comprising an elongated, longitudinally extending base means and wall means secured thereon defining at least two cell means longitudinally extending along said base means for containing and separating cables of different types, said wall means being cut away at the intersections of said trenches and said cable distribution ducts to provide an area on said base means free from any cell means, said base means having openings therein at desired free areas thereof, and an open pan means depending from said base means and extending through a said opening; said trenches comprising an open, longitudinally extending, U-shaped base pan means having a bottom portion and opposed side portions, and cover means removably secured to and closing said open U-shaped base pan means, said bottom portion of said base pan means having apertures therein at said intersections of said trenches and said distribution ducts for permitting direct access from said trench to the distribution duct and pan means below.

2. The underfloor assembly according to claim 1, wherein said wall means provides an inner closed cell means and two outer closed cell means, said wall means being cut away at said intersections to remove said outer cells and to provide first and second free areas on said base means at said intersections.

3. The underfloor assembly according to claim 2, wherein said inner cell means is off center with respect to said base means, said first free area is larger than the second free area, and said pan means extends through a said opening in a desired said first free area of said base means.

4. The underfloor assembly according to claim 1, wherein said wall means provides an inner closed cell means and two outer closed cell means, said wall means being cut away to remove the inner cell means and one of the outer cell means at said intersections to provide said free area.

5. The underfloor assembly according to claim 1, wherein said wall means provides two closed cell means, said wall means being cut away to remove the closed cell means at said intersections to provide said free area.

6. A cable distribution duct, which comprises an elongated, longitudinally extending base means and wall means secured thereon defining at least two cell means longitudinally extending along said base means for containing and separating cables of different types, said wall means being cut away at predetermined, longitudinally spaced-apart locations on said base means to provide an area on said base means free from any cell means, said base means having openings therein at desired free areas thereof, and an open pan means depending from said base means and extending through a said opening.

7. The underfloor assembly according to claim 6, wherein said wall means provides an inner closed cell means and two outer closed cell means, said wall means being cut away at said locations to remove said outer cells and to provide first and second free areas on said base means at said locations.

8. The underfloor assembly according to claim 7, wherein said inner cell means is off center with respect to said base means, said first free area is larger than the second free area, and said pan means extends through a said opening in a desired said first free area of said base means.

9. The underfloor assembly according to claim 6, wherein said wall means provides an inner closed cell means and two outer closed cell means, said wall means being cut away to remove the inner cell means and one of the outer cell means at said locations to provide said free area.

10. The underfloor assembly according to claim 6, wherein said wall means provides two closed cell means, said wall means being cut away to remove the closed cell means at said locations to provide said free area.

* * * * *